Figure 3:
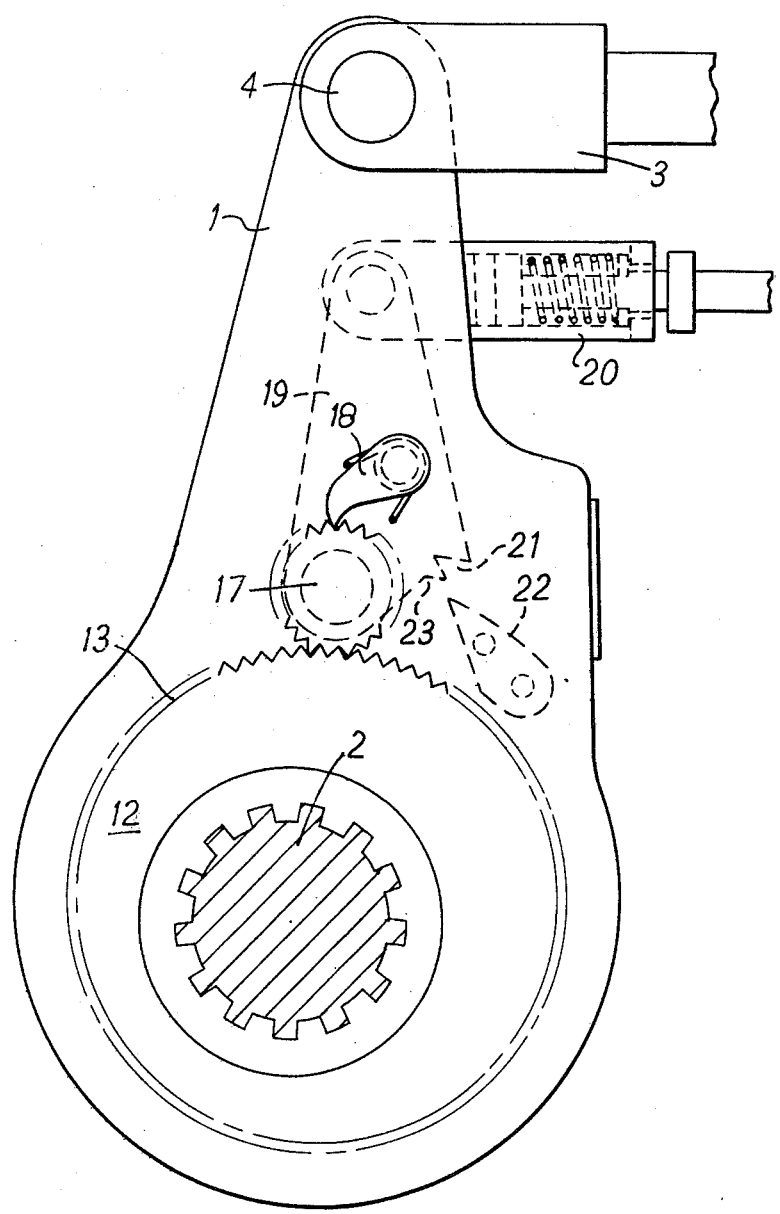

United States Patent [19]
Taig

[11] 3,933,056
[45] Jan. 20, 1976

[54] SLACK ADJUSTERS
[75] Inventor: Alistair Gordon Taig, Bristol, England
[73] Assignee: Bendix Westinghouse Limited, Bristol, England
[22] Filed: Apr. 8, 1974
[21] Appl. No.: 458,980

[30] Foreign Application Priority Data
May 12, 1973 United Kingdom............... 22729/73

[52] U.S. Cl. .................................................. 74/399
[51] Int. Cl.² ........................................ F16H 35/06
[58] Field of Search ...................................... 74/399

[56] References Cited
UNITED STATES PATENTS
3,013,638  12/1961  Satrum........................... 188/79.5 K
3,361,230  1/1968  Hildebrand et al. ........... 188/79.5 K
3,811,335  5/1974  Hunsberger........................... 74/409

*Primary Examiner*—Leonard H. Gerin
*Attorney, Agent, or Firm*—Larson, Taylor and Hinds

[57] ABSTRACT

An automatic slack adjuster is proposed which has an internally geared input member and an externally geared output member which is slightly eccentrically mounted within the input member and meshes with it and adjustment is achieved by moving the centre of the output member relative to the centre of the input member to effect relative rotative adjustment, the movement of the centre of the output member being achieved by rotation of eccentric bushes in which it is mounted.

14 Claims, 9 Drawing Figures

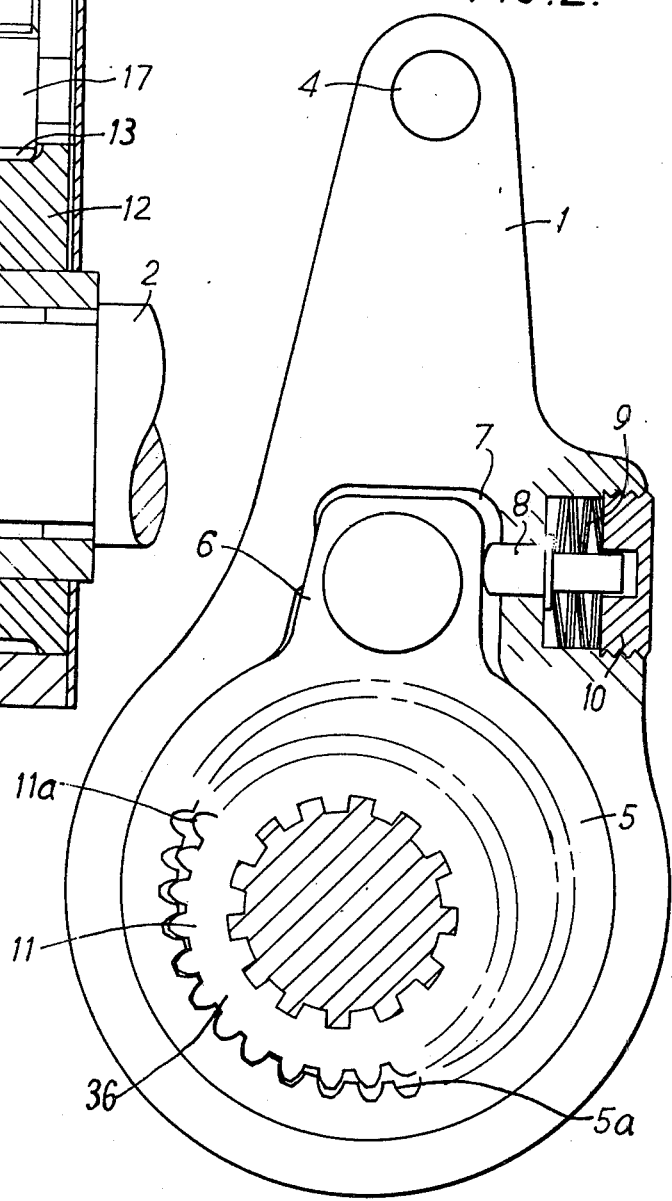

SLACK ADJUSTERS

This invention relates to slack adjusters and relates especially but not exclusively to automatic slack adjusters for use in a brake operating linkage for a vehicle. according According to the present invention there is provided a slack adjuster including an angularly movable output member one member being mounted eccentrically with respect to the other member and having external teeth mutually intermeshing with internal gear teeth of the other member and adjustment means for moving the centre of one said member in relation to the centre of the other said member to reduce slack in a mechanism when connected thereto.

It will be appreciated that since movement of the centre of one member is effected relative to the centre of the other member, and the two members are intermeshed, the effect is a rotation of one member relative to the other. Such relative rotation is effective to reduce slack.

Preferably, the member having external gear teeth is the output member and the member having internal gear teeth is the input member.

The externally geared member may be journalled in an eccentric bush mounted for movement which is co-axial with the externally geared member.

The eccentric bush may be provided with further gear teeth which mesh with the adjustment means.

The adjustment means may include a pinion meshing with said further gear teeth for effecting adjustment.

The said pinion wheel may be provided with a pawl mechanism by which when relative movement between it and the input member occurs which is more than a given amount, rotation of the pinion is effected by a subsequent return movement of the input member.

The pawl of the pawl mechanism may be mounted upon an arm provided with means for coupling it to a reference position such that the relative movement between the pawl mechanism and the input member can occur.

Again, the invention is more especially but not exclusively concerned with slack adjusters for vehicles where it is desired to provide for adjustment of slack in a brake linkage up to a prescribed loading being imposed on the linkage so that the adjustment tends to remove true slack but not stretch in the mechanism. In this case, the input member is mounted to be actuable by a main member, a predetermined permitted movement relative to which under more than a predetermined load is provided for.

In order that the invention may be more clearly understood and readily carried into effect, the same will be further described by way of example with reference to the accompanying drawings of which, FIG. 1 shows a sectional view through a slack adjuster in accordance with one embodiment of the invention, FIGS. 2 and 3 shows views on sections of the adjuster of FIG. 1 to show more clearly the construction of the intermeshing input and output members (FIG. 2) and the eccentric bush and pawl mecahnism (FIG. 3) and FIGS. 4, 5, 6, 7, 8 and 9 illustrate views of sections of a modified form of a slack adjuster according to the invention.

Referring to FIGS. 1 to 3 of the drawings, it will be desirable to refer to these drawings together in order to clarify the description of the slack adjuster.

The slack adjuster comprises a main member in the form of a lever arm 1 within which there is a splined output shaft 2. Externally the slack adjuster has the general appearance of a brake operating lever such as is employed for actuating the brakes of a vehicle from an actuator rod such as the rod 3 which is journalled via a clevis pin 4 to the arm of the member 1. Within the main body of the lever arm 1 there is also housed an input member denoted by the reference 5. This input member is such as to be rotatable within the housing member over a small predetermined rotational distance set by the clearance between a projection 6 and a slot 7 into which 6 projects in the arm of the lever 1. In an unloaded condition, the projection 6 is biassed into the position shown by a loading means comprising a button 8 which is spring-loaded via belleville washers 9 and a screw-adjustment 10. This provides a load sensing facility. The input member 5 is provided with internally formed gear teeth 5a which are of a special form to mesh with a substantial number of gear teeth 11a of an output member 11 which is eccentrically journalled between eccentric bushes 12 and into which output member 11 the output shaft 2 is splined. The bushes 12 are provided with external gear teeth 13 and from FIG. 1 it is seen that these eccentric bushes are located on either side of the input and output members. In addition, the peripheral teeth 13 of the eccentric bush mesh with a toothed pinion 17 which is rotatably journalled within the projection 6 on the input member. The teeth of the pinion 17 serve a dual funtion 5 of gear teeth on the one hand and ratchet teeth on the other and a pawl 18 is shown in FIGS. 1 and 3 which is mounted upon an arm 19 pivotally engaged with a spigot extending from the pinion wheel 17. The outer end of the arm 19 is provided with a clevis 20 by which it is connected via a resilient linkage to a fixed position (not shown) on the back plate of the braking mechanism or a point on the vehicle chassis. By such means, the pawl 18 can be arranged to remain more or less in a fixed position during movement of the arm 1 of the arrangement and the other parts carried thereby, including the pinion 17. The arm 19 is provided with an abutment part with a notch 21 which is engageable with a stop part 22 mounted on the main body of the adjuster such that depending upon the amount of slack which is present in a mechanism using the device, the stop part 22 either engages a position 23 or the notch 21 and thereby determines whether slack is removed by the mechanism or not on a return stroke. In either case, the stop part 22 has the function of limiting the amount of movement which is permitted of the lever 19 relative to the arm 1 accordiing to whether it engages positions 21 or 23 of the abutment part.

In operation of the slack adjuster, assuming it is employed for operating the brakes of a vehicle, a brake actuator moves the connecting rod 3 to the left as shown in FIGS. 2 and 3 and therefore anti-clockwise motion of the lever 1 occurs about the centre of the output shaft 2, applying a torque via the meshing teeth 5a, 11 a of the internally and externally geared input and output members 5 and 11, to the splined output shaft 2. Initially, the arm 19 is retained in a given position and the pawl 18 tends to ride up a tooth of the pinion wheel 17. When a braking load is encountered, for a certain value thereof as set by the adjustment of the belleville washers the main member 1 moves in relation to the projection 6 of the input member and if the brake is in need of adjustment, the movement of the actuating lever is sufficient to permit the pawl to reach the crest of a tooth of the pinion 17. Also, the stop part 22 will enter the notch 21 of the arm 19 thereby allowing the pawl 18 to travel over the first tooth. On return movement of the rod 3, the arm 1 rotates in a clockwise direction about the centre of the shaft 2 and since the pawl 18 has travelled over a tooth of the pinion 17, the return motion of the arm 19 relative to the arm 1 causes anti-clockwise rotation of the pinion 17 and subsequent clockwise rotation of the eccentric bushes 16. A slight clockwise orbiting motion is therefore produced of the centre of the output member 11 which is carried by the eccentric bushes, about the centre of the input member 5 and this in its turn provides a small anti-clockwise rotation of the output member 11 by virtue of the gearing thereof with the input member 5.

Return motion of the rod 3 therefore has the effect of advancing the output shaft 2 relative to its previous starting position such as to reduce the amount of slack in the system. Repeated operations such as described effect successive elemental reductions in the amount of slack until a situation is reached where upon the next operation of the arm 1 in an anti-clockwise direction, negligible movement of the input member 6 occurs before loading of the button 8 is such as to depress the belleville washers. Under these circumstances, a reduced amount of motion of the arm 19 relative to the arm 1 occurs before engagement of the stop part 22 with the arm 19. Thus the stop part 22 abuts at the notch point 23 with the arm 19 and subsequent movement of the arm 1 carries with it the arm 19 against the effect of the resilient spring in the linkage 20. In this case, the relative movement of the main member 1 and the arm 19 is not sufficient to permit the pawl 18 to pass over the crest of a tooth on the pinion 17. On the return stroke, the pinion 17 is not then driven around by the pawl 18 and no adjustment of slack is effected.

From the foregoing, it will be appreciated that adjustment of the slack adjuster can be effected by determining the loading at which the belleville washers 9 are compressed during movement of the main member 1.

It will be observed moreover that the effect of providing the resilient connection 20 between the arm 19 and a fixed point, is to enable the arm 19 and the stop part 22 to limit the amount of slack which is adjusted at each operation to that amount which corresponds with a single tooth pitch of the pinion 17. This is so since excessive slack in the system, cannot produce more than a predetermined amount of movement of the arm 19 in relation to the arm 1 in one operation.

Figure 4:
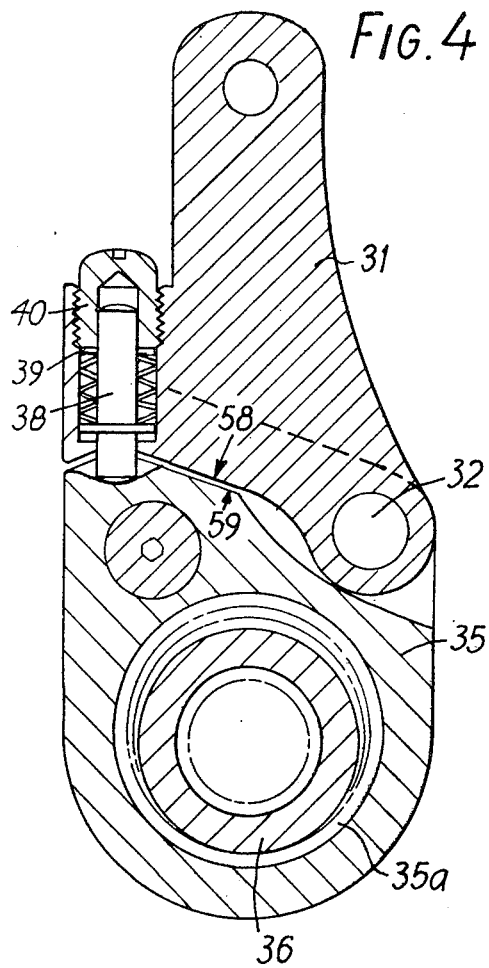
Figure 5:
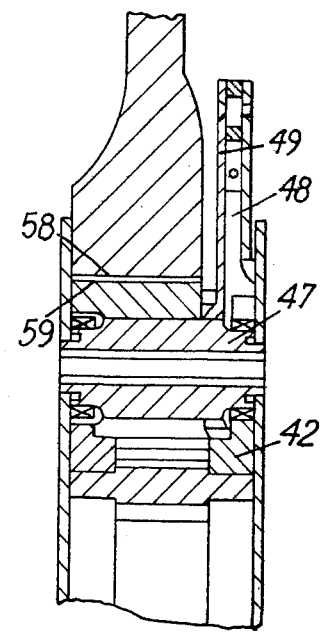
Figure 8:
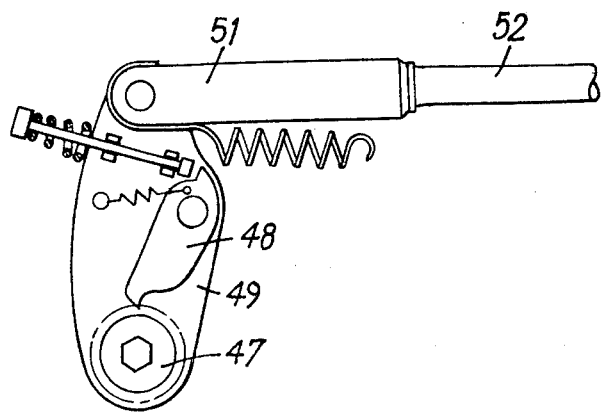
Figure 6:
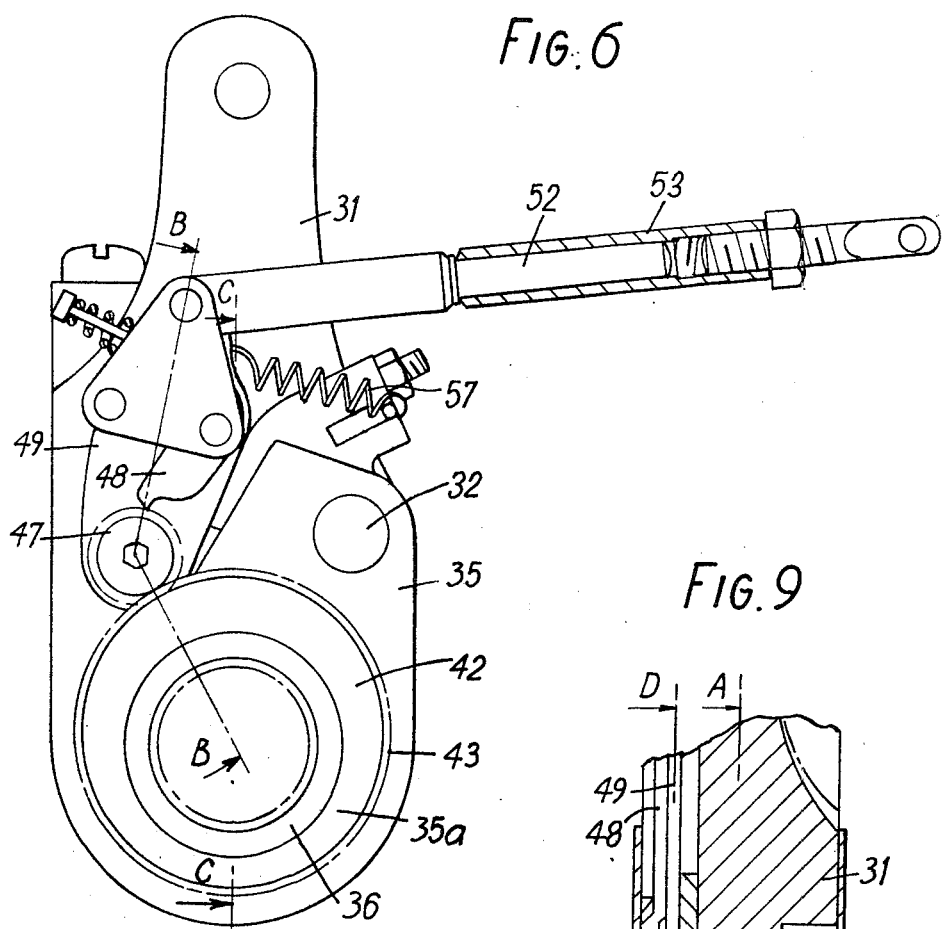
Figure 9:
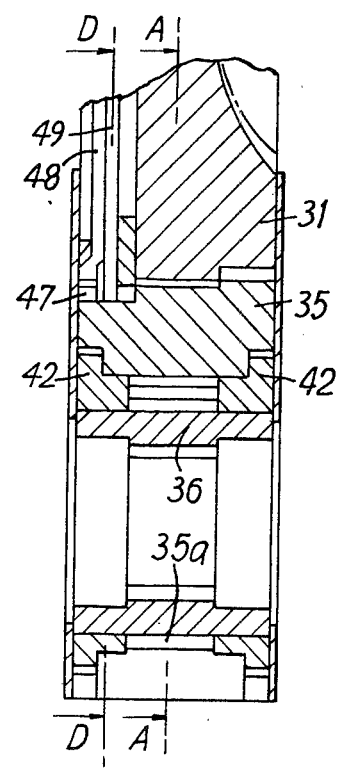

A modified arrangement of slack adjuster according to the invention is shown in FIGS. 4, 5, 6, 7, 8 and 9 which show sectional and other diagrammatical views of the modified arrangement. This is essentially similar to the arrangement of FIGS. 1, 2 and 3 but instead of the main member 1 extending around the input member 5 of the previous arrangement, the main member which is now denoted by the reference 31 is mounted by means of a pivot pin 32 to the input member 35 as shown more particularly in FIGS. 4 and 6. The input member is again provided with internal meshing teeth 35A and the output member is mounted eccentrically within the input member and meshes with it in exactly the same way. Again, the output member is carried by eccentric bearing bushes such as 42 which again are provided with external gear teeth 43 which mesh with an adjustment ratchet/pinion 47 similar to the pinion 17 of the arrangement of FIG. 3. The sectional view of FIG. 9 shows these quite clearly. Mounted to be angularly movable about the same centre as the pinion 47, there is a reference arm denoted by the reference 49 and this is connected via a clevis 51 to a rod 52 which by virtue of being slideable in an adjustable sleeve 53, is an extendable but not a compressable link. The arm 49 carries a pawl 48 which engages with the pinion 47 similarly to the pawl 18 and pinion 17 of FIG. 3. The section B—B of FIG. 6 is shown in FIG. 5. Likewise, the section C—C of FIG. 6 is shown in FIG. 9.

Figure 7:
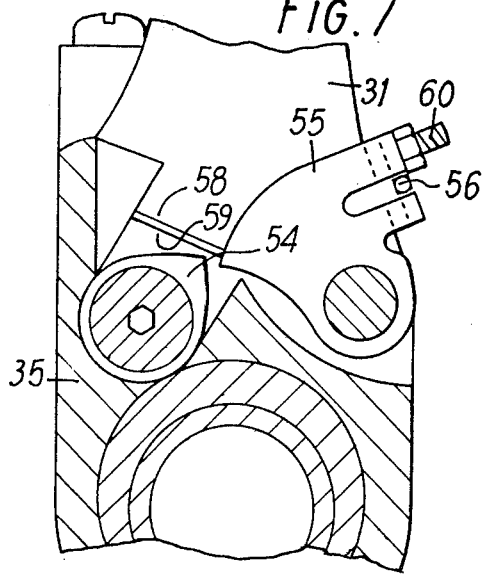

Referring now to FIG. 7, which shows a section through the arrangement behind the arm 49, it will be seen that mounted on the same centre as the pinion 47 and the arm 49, there is a stop part denoted by reference 54 which is angularly movable together with the arm 49 in relation to the input path 35 of the slack adjuster. A sectional view D—D from FIG. 9 is shown in FIG. 7 and from this it is seen that pivoted to be angularly movable in relation to the main part and the input part and about the pivot 32, there is provided an abutment member denoted by reference 55 between a projection 56 on which and the end of the crevice 51 which is connected to the arm 49, there is a tension spring 57. This spring normally retains the abutment part in a fixed position relative to the main part 31, this position being adjustable by a stop screw 58. It will be appreciated however that in the event of an excessive thrust being exerted on the part 55 tending to rotate it in a clockwise direction, the spring 57 will permit such rotation such as to avoid strains.

Referring now to the main part 31 and the input part 35, it will be seen more particularly from FIG. 4, which corresponds to section AAA of FIG. 9 that by virtue of an adjustable thrust spring arrangement denoted generally by the references 38, 39 and 40 corresponding to the parts 8, 9 and 10 of FIG. 2 the main member and the input member are urged angularly such as to maintain a preset clearance between shoulders 58 and 59. This provides a load sensing facility.

Referring now to the operation of the modified form of slack adjuster of FIGS. 4 to 7, as previously, the reference arm 49 is tied to a fixed part of the vehicle via the crevice 51 and in this case the adjustable connection via 53. In the relaxed condition, where the brake is released, the slack adjuster is in a condition with the stop part 54 and the abutment part 55 relatively positioned as shown in FIG. 7 with the preset clearance existing between shoulders 58 and 59. Assuming that there is a substantial amount of slack existing in the brake linkage, movement of the main part 31 in an anti-clockwise direction causes similar rotation of the input part 35 and because of the intermeshing of the input and output parts, corresponding rotation occurs of the output part 36. With such an amount of slack present, this movement occurs whilst still maintaining the clearance between shoulders 58 and 59 due to the relatively high force which is present in the spring arrangement 39 to ensure this. When the linkage tightens and a braking load is sensed, a value of braking load is reached when spring arrangement 39 compresses and the space between shoulders 58 and 59 closes. Under these conditions with a relatively large amount of slack in the brake linkage, the stop part 54 which rotates with the reference arm 49 will have cleared the nearest point of the abutment part 55 before the gap between 58 and 59 closes. Under these conditions, the pawl 48 will have ridden over at least one tooth of the pinion wheel 47 and on the return stroke, the pinion wheel 47 is rotated to effect an elemental amount of adjustment of slack in precisely the same manner as was achieved in the arrangement of FIGS. 1 to 3.

Considering now a case where there is no slack in the linkage, so that when the main part 31 is moved in an anti-clockwise direction for purposes of effecting a brake application, a load is almost immediately encountered and a point is rapidly reached when the clearance between shoulders 58 and 59 closes such that the abutment part 55 moves in an anti-clockwise direction relative to the input part 35 such as to on reaching it, engage the stop part 54 which is being rotated relative to the input part 35 is thereby inhibited in spite of possible continued movement towards an increasingly higher brake application. Such further movement of the input part is made possible by the fact that the rod 52 can for such movement slide outwardly from the adjustment part 53. It being remembered that up to this point, parts 52 and 53 are retained in fixed relationship by virtue of the presence of the tension spring 57. Under such conditions, the pawl 48 does not ride up over the crest of a tooth of the pinion 47 so that on the return stroke, no adjustment of slack is effected.

Whilst both the preferred form of slack adjuster of FIG. 4 to 7 and the slack adjuster of FIGS. 1 to 3 have both been specifically described to be automatic the basic concept of the present slack adjuster as claimed may readily be employed in non-automatic. In addition, whilst load sensing is an additional feature of the above described slack adjusters, the invention is by no means limited to slack adjusters with such load sensing.

Having thus described our invention what we claim is:

1. A slack adjuster including an angularly movable input member and an angularly movable output member a one member being mounted eccentrically with respect to the other member and having external gear teeth mutually intermeshing with internal gear teeth of the other member and adjustment means for moving the centre of one said member in relation to the centre of the other said member to reduce slack in a mechanism when connected thereto.

2. A slack adjuster as claimed in claim 1, the input member having internal gear teeth and the output member having external gear teeth.

3. A slack adjuster as claimed in claim 1 the adjustment means having means associated therewith for sensing slack in a forward motion of the input part and in response thereto effecting the adjustment during a return motion thereof.

4. A slack adjuster as claimed in claim 1, the gear teeth being profiled to provide close meshing of several teeth at the same time.

5. A slack adjuster as claimed in claim 1, the output member being mounted for rotation within eccentric bushing means which is itself rotatably housed relative to the input member.

6. A slack adjuster as claimed in claim 5, the bushing means having external gear teeth which mesh with a pinion rotatably carried by the input member and by which the eccentric bushing means is rotatable.

7. A slack adjuster as claimed in claim 6 the gear teeth of the pinion serving also as ratchet teeth which co-operate with a pawl movable over at least one tooth in a forward movement to give rise to an adjustment in the subsequent return movement of the input means.

8. A slack adjuster as claimed in claim 7, the pawl being carried by an arm pivoted at one end about the centre of the pinion and provided with means for tying at the other end to a reference point.

9. A brake mechanism slack adjuster as claimed in claim 3 having a further main operating member which is coupled to the input member for effecting movement thereof and resilient means between the main and input members which under load permits a predetermined relative movement therebetween for enabling the slack adjuster to distinguish between true slack and movement of the main member under load.

10. A slack adjuster as claimed in claim 9, including means operable to inhibit slack adjustment in the event of less than a predetermined movement of the main member in a forward motion prior to relative movement between the main and input members.

11. A slack adjuster as claimed in claim 10 including means which inhibits as aforesaid by preventing movement of the said arm relative to the input member.

12. A slack adjuster as claimed in claim 11, including a stop part fixed to move with said arm and an abutment part movable with the main member relative to the input member into the path of the stop part.

13. A slack adjuster as claimed in claim 12, the abutment part being resiliently biassed towards the stop part and a fixed position relative to the main member.

14. A slack adjuster as claimed in claim 12 the resilient bias being provided by a tension spring between the abutment part and said arm.

* * * * *